H. R. VAN VLECK.
GAS ENGINE.
APPLICATION FILED FEB. 8, 1913.
1,118,975.
Patented Dec. 1, 1914.
2 SHEETS—SHEET 1.
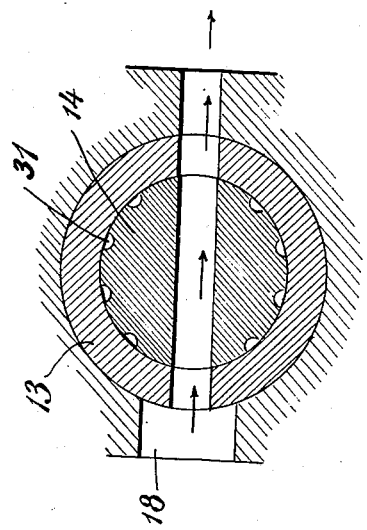
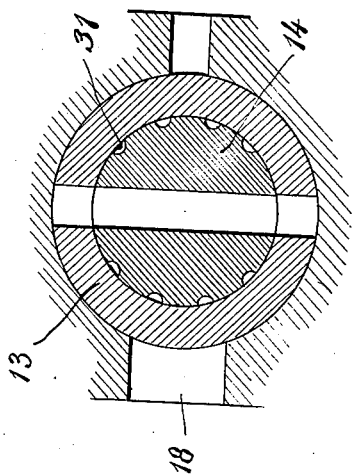
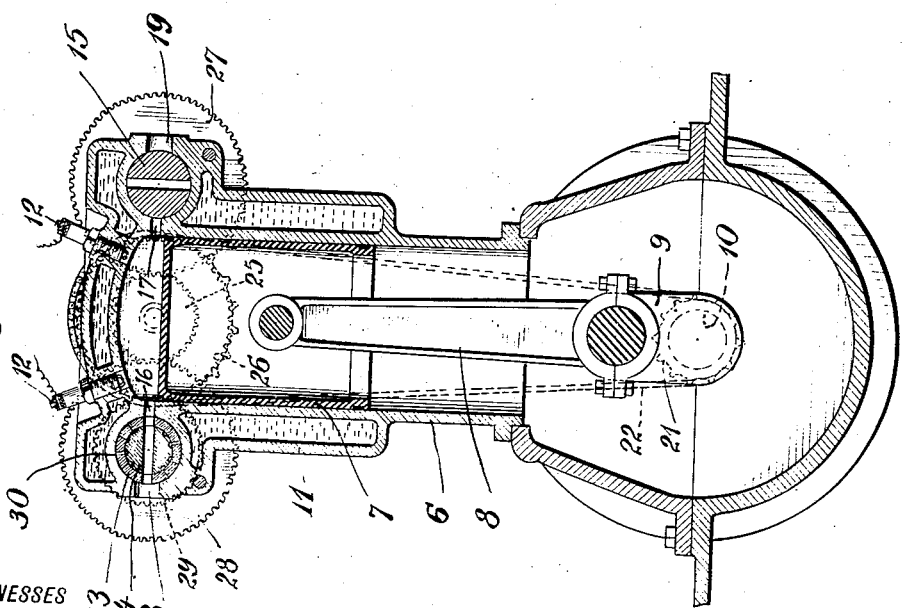
WITNESSES
INVENTOR
H. R. Van Vleck,
BY
ATTORNEYS H. R. VAN VLECK.
GAS ENGINE.
APPLICATION FILED FEB. 8, 1913.
1,118,975.
Patented Dec. 1, 1914.
2 SHEETS—SHEET 2.
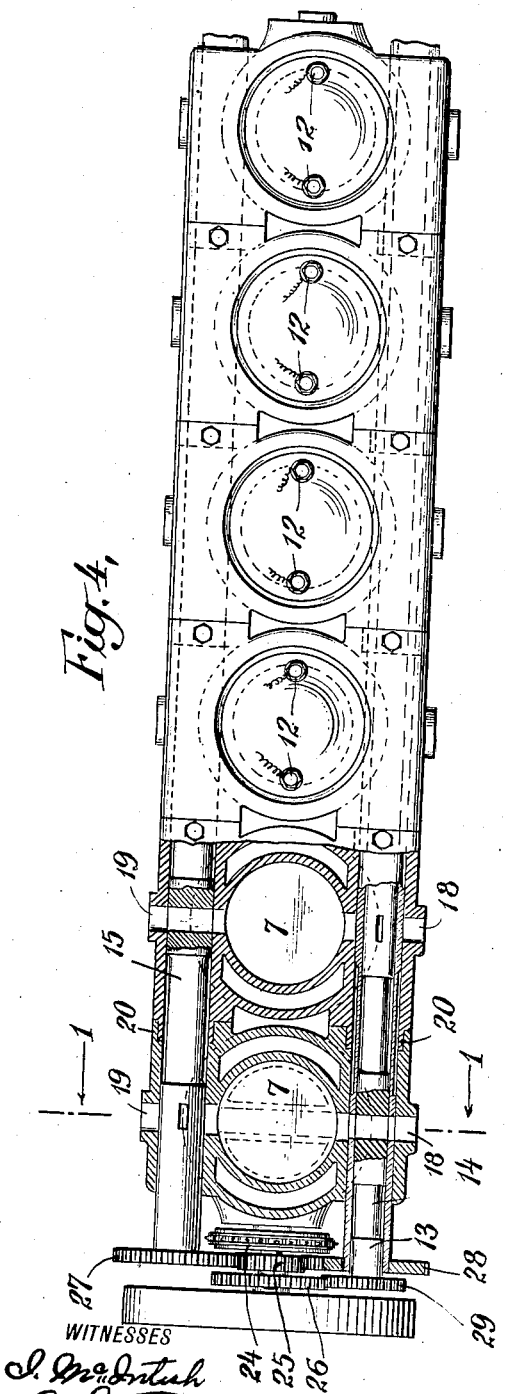
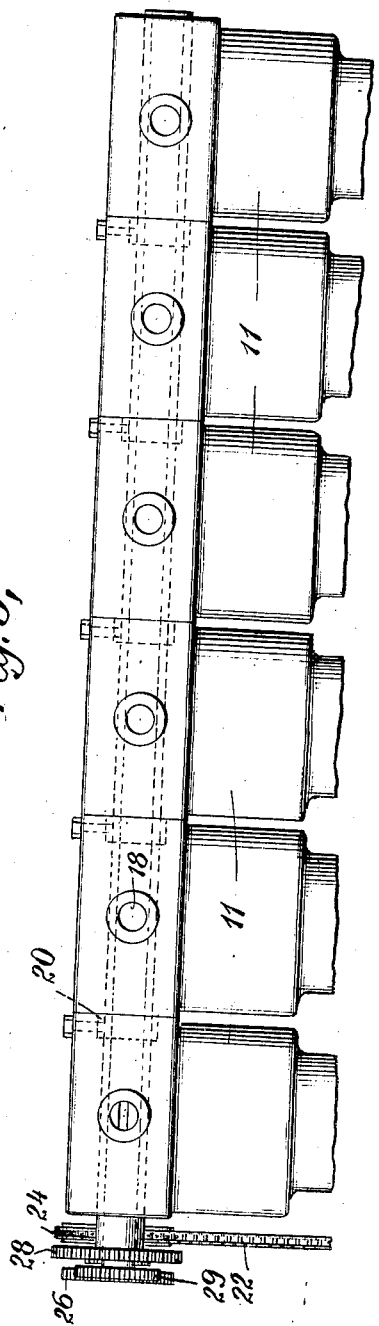
INVENTOR
H. R. Van Vleck,
BY
ATTORNEYS
WITNESSES

UNITED STATES PATENT OFFICE.

HORACE RUSS VAN VLECK, OF MONTCLAIR, NEW JERSEY.

GAS-ENGINE.

1,118,975.  Specification of Letters Patent.  Patented Dec. 1, 1914.

Application filed February 8, 1913. Serial No. 747,070.

*To all whom it may concern:*

Be it known that I, HORACE RUSS VAN VLECK, a citizen of the United States, residing at Montclair, in the county of Essex and State of New Jersey, have invented certain new and useful Improvements in Gas-Engines, of which the following is a specification.

This invention relates to gas engines of the internal explosion type and is directed to the provision of an improved form of valve mechanism for use in such engines.

The object of the invention is to provide a rotary valve mechanism for a gas engine so constructed as to provide an inlet passage for the gas through the valve which is of ample area and so arranged that the inlet port will be opened quickly and held open for such a period of time during the movement of the piston in the cylinder that a full charge of gas will be drawn into the cylinder.

The invention involves the provision of an inlet valve consisting of two concentric rotatable valve-members and driving mechanism connecting these valve-members to the engine-shaft and arranged to rotate them at different speeds. The valve-members have openings therethrough which are adapted to aline with each other and with the port in the cylinder to open the passage for the gases from the gas-supply device, such as a carbureter, to the cylinder.

In the preferred embodiment of the invention the two valve-members constituting the inlet valve are a sleeve adapted to rotate at one quarter of the speed of the engine-shaft and a cylindrical member within this sleeve adapted to rotate at three-quarters of the speed of the engine-shaft. Both the sleeve and the cylindrical member have openings therethrough and when the two members are rotated as above set forth, these openings will come into alinement with each other and with the port in the wall of the cylinder once every second revolution of the engine-shaft as is desired in a four-cycle gas engine. In combination with such a valve mechanism I prefer to employ a rotary exhaust valve, this being a cylindrical member having a passageway therethrough and arranged to be driven by the engine-shaft at one quarter of the speed of the engine-shaft so that the opening through the valve-member will aline with the exhaust port of the cylinder in alternate revolutions of the engine-shaft.

The preferred embodiment of the invention is illustrated in the accompanying drawings in which—

Figure 1 is a vertical section through a gas engine constructed in accordance with the invention, Figs. 2 and 3 are enlarged sectional views through the inlet valve, Fig. 4 is a plan view partly in horizontal section of the engine shown in Fig. 1, and Fig. 5 is an elevation of the upper portion of the engine.

Referring to these drawings, 6 indicates the cylinder in which the piston 7 is adapted to reciprocate. This piston is connected by the connecting rod 8 to a crank 9 on the engine-shaft 10. The cylinder is provided with a water-jacket 11 and one or more spark plugs 12. These parts are all of the usual or any suitable construction. On one side the cylinder is provided with an opening of circular cross-section, having its axis transverse to the axis of the cylinder. In this opening is provided an inlet valve comprising two valve-members. One of these members is a sleeve 13 of a size to fit snugly in the opening in the wall of the cylinder and rotate freely therein. The other valve-member 14 is of circular cross-section and of a size to fit snugly in sleeve 13 and rotate freely therein. On the opposite side of the cylinder the casing for the cylinder is formed to provide a similar opening of circular cross-section within which is located an exhaust valve 15 of circular cross-section, and of a size adapted to fit snugly within the circular opening and rotate freely therein. Inlet and exhaust ports 16 and 17, respectively, lead from the circular openings above mentioned to the interior of the cylinder and on the opposite sides of the rotary valves, passages 18 and 19 are provided the former for connection to the carbureter and the latter for connection to the atmosphere.

In Figs. 4 and 5 the engine is shown as having six cylinders, each cylinder being cast individually. Each cylinder is provided with circular bosses 20 about the openings for the valves, which bosses are adapted to enter countersinks in the next adjacent cylinder. The valve-members 13 and 14 constituting the inlet valve extend along all six of the cylinders as does also valve-member 15 constituting the exhaust valve.

The three rotary valve-members are connected by suitable gearing to the engine-shaft so as to be driven thereby. In the present instance the engine-shaft is shown as provided with a sprocket 21 to receive a chain 22 which chain drives sprocket wheel 24 mounted on a stub shaft and having two gears 25 and 26 integral therewith or secured thereto. The gear 25 meshes with two gears 27 and 28, the former being secured to the exhaust-valve 15 and the latter being secured to the sleeve 13 of the inlet valve. The gear 26 is larger than the gear 25 and meshes with a gear 29 secured upon the member 14 of the inlet valve. The gearing above described is such that the exhaust valve-member 15 and the outer valve-member 13 of the inlet valve are rotated at one-quarter of the speed of the engine-shaft and such that the inner member 14 of the inlet valve is rotated at three-quarters of the speed of the engine-shaft. The engine so constructed operates in the manner usual with four-cycle engines. Fig. 1 shows the inlet valve in the open position. After the engine-shaft has made one revolution so that the piston is again in the position in which it is shown in Fig. 1, the member 14 of the inlet valve will have moved through three-quarters of a revolution and the member 13 of the inlet valve will have moved through one-quarter of a revolution. These parts will then be in the position indicated in Fig. 3, and it will be seen that the passage for the gases is closed. During another revolution of the engine-shaft the member 14 of the valve will turn through three-quarters of a revolution and the member 13 through one-quarter of a revolution so that these parts will again be in the position in which they are shown in Fig. 1. Fig. 1 shows the exhaust valve 15 closed but during one complete revolution of the engine-shaft this member 15 will turn through one-quarter of a revolution so that the exhaust passage will be open. In this way both the inlet passage and the exhaust passage will be opened at the appropriate times in every other revolution of the engine-shaft as is required for operation in accordance with the four-cycle principle.

By reason of the provision of the two concentric valve-members rotating in the same direction but at different speeds, as above set forth, the passage for the incoming gases may be made to open wide so as to effect a passageway of large cross-section and thus admit an ample supply of gas. Also this passageway for the incoming gases may be made to remain open through a substantial portion of the downward movement of the piston in the cylinder to insure the supply of a sufficient amount of gas.

In order to insure easy working of the valve-members 13 and 14, I have provided means for supplying them with a lubricant in ample quantity. For this purpose, the sleeve or tubular valve-member 13 is provided with a plurality of radial openings therethrough for the passage of a lubricant through the sleeve to the inner member 14. These radial openings are shown at 30. Also, the inner valve-member 14 is provided with a plurality of depressions 31 forming cups to receive and hold the lubricant and aid in distributing a thin film of the lubricant over the surface of the member 14.

In the foregoing, I have described the preferred embodiment of my invention but I wish it to be understood that the invention is not limited to the precise construction shown. This may be modified in various respects without departing from the spirit of the invention. The speeds mentioned above for the two parts of the intake valve relatively to the engine shaft may be changed. Obviously the speeds specified may be doubled or made any multiple of the speeds given. Also the two members of the intake valve may be made to rotate in opposite directions instead of in the same direction. These and other modifications of the invention as above described I consider within the scope of the invention and I aim to cover them by the terms of the claims appended hereto.

Having described my invention, what I claim as new therein and desire to secure by Letters Patent of the United States is:

1. A gas-engine having a cylinder, a shaft, a piston reciprocating in the cylinder and connected to the shaft, a valve comprising two rotatable concentric valve-members having openings therein adapted to aline with each other and with an opening in said cylinder, and driving mechanism connecting said valve-members to the engine-shaft and arranged to rotate them in correspondence with the rotation of the engine shaft but at different speeds, substantially as set forth.

2. A gas-engine having a cylinder, a shaft, a piston reciprocating in the cylinder and connected to the shaft, a valve comprising two rotatable concentric valve-members having openings therein adapted to aline with each other and with an opening in said cylinder, and driving mechanism connecting said valve-members to the engine-shaft and arranged to rotate them one at three times the speed of the other, substantially as set forth.

3. A gas-engine having a cylinder, a shaft, a piston reciprocating in the cylinder and connected to the shaft, a valve comprising two rotatable concentric valve-members having openings therein adapted to aline with each other and with an opening in said cylinder, and driving mechanism connecting said valve-members to the engine-shaft and arranged to rotate them one at one quarter of the speed of the engine shaft and one at three-quarters of the speed of the engine shaft, substantially as set forth.

4. A gas-engine having a cylinder, a shaft, a piston reciprocating in the cylinder and connected to the shaft, a tubular valve-member mounted for rotation with its axis transverse to the axis of the cylinder, a valve-member located in said member, there being openings in said members adapted to aline with each other and with a port in the wall of the cylinder, and driving mechanism connecting the engine shaft to said members and arranged to rotate them at different speeds, substantially as set forth.

5. A gas-engine having a cylinder, a shaft, a piston reciprocating in the cylinder and connected to the shaft, a tubular valve-member mounted for rotation with its axis transverse to the axis of the cylinder, a valve-member located in said member, there being openings in said members adapted to aline with each other and with a port in the wall of the cylinder, and driving mechanism connecting the engine shaft to said members and arranged to rotate them one at one-quarter and one at three quarters of the speed of the engine shaft, substantially as set forth.

6. A multiple-cylinder gas-engine having a plurality of cylinders arranged side by side, a piston in each cylinder, a shaft to which the pistons are connected, said cylinders having an opening therethrough extending transverse to the axes of the cylinders, a tubular valve-member located in said opening and extending along all the cylinders, a valve-member located in said tubular member and extending along all the cylinders and gearing connecting the engine shaft in driving relation to said valve-members and arranged to rotate them at different speeds, said members having an opening therethrough for each cylinder adapted to aline with each other and with a port leading to the cylinder, substantially as set forth.

7. A gas-engine having a cylinder, a shaft, a piston reciprocating in the cylinder and connected to the shaft, said cylinder having inlet and exhaust ports, two rotatable concentric valve-members controlling the inlet port, a rotatable valve controlling the exhaust port, and gearing connecting the engine-shaft to said valve-members and said valve and arranged to rotate said valve-members at different speeds, substantially as set forth.

8. A gas-engine having a cylinder, a shaft, a piston reciprocating in the cylinder and connected to the shaft, said cylinder having inlet and exhaust ports, two rotatable concentric valve-members controlling the inlet port, a rotatable valve controlling the exhaust port, and gearing connecting the engine-shaft to said valve-members and said valve and arranged to rotate the valve-members one at one quarter and the other at three quarters of the speed of the engine-shaft and arranged to rotate said valve at one quarter of the speed of the engine shaft, substantially as set forth.

9. A gas-engine having a cylinder, a piston therein, a shaft connected to the piston, a valve comprising two rotatable concentric valve-members having openings therein adapted to aline with each other and with a port in the cylinder, the outer of said members having openings therethrough for the passage of a lubricant and the inner one having depressions to receive a lubricant and connections from the engine-shaft to said members for rotating them at different speeds, substantially as set forth.

10. In an engine, a cylinder, a valve chamber adjacent thereto, a piston in the cylinder, a pair of oppositely rotatable valve members in the valve chamber and means for driving the valve members at unlike speeds when the engine is in operation.

11. In an engine, a piston, a cylinder having a port and a valve comprising a pair of oppositely rotating members having predetermined unlike speed relations to the engine and arranged to coöperate with each other and with the cylinder port.

12. An engine valve comprising a pair of oppositely rotating members adapted to be operated at unlike speeds.

13. In an engine, a piston, a cylinder and a valve comprising a pair of cylindrical sleeves rotatably mounted one within the other adapted to be operated at unlike speeds and having openings arranged to coincide at suitable points in the engine operation.

This specification signed and witnessed this 27th day of January, 1913.

HORACE RUSS VAN VLECK.

Witnesses:
I. McINTOSH,
J. F. COLLINS.